United States Patent [19]

Sato et al.

[11] 4,309,521

[45] Jan. 5, 1982

[54] PROCESS FOR PRODUCING α-OLEFIN POLYMERS

[75] Inventors: Akihiro Sato, Chibaken; Kazutsune Kikuta, Ichiharashi; Kenji Matsuda, Ichiharashi; Toshihiro Uwai, Ichiharashi; Tohru Hanari, Ichiharashi, all of Japan

[73] Assignee: Chisso Corporation, Osaka, Japan

[21] Appl. No.: 149,684

[22] Filed: May 14, 1980

[30] Foreign Application Priority Data

Feb. 27, 1980 [JP] Japan ............................. 55-23785

[51] Int. Cl.$^3$ .......................... C08F 4/66; C08F 10/00
[52] U.S. Cl. ............................. 526/114; 252/429 B; 525/247; 526/65; 526/116; 526/119; 526/122; 526/127; 526/137; 526/139; 526/140; 526/141; 526/142; 526/153; 526/158; 526/348; 526/348.6; 526/351; 526/901; 526/902; 526/904
[58] Field of Search ............... 526/114, 116, 122, 127, 526/137, 139, 140, 141, 142, 158, 153, 119; 525/247

[56] References Cited

U.S. PATENT DOCUMENTS

| 4,136,243 | 1/1979 | Appleyard et al. | 526/139 |
| 4,210,729 | 7/1980 | Hermans | 526/119 |
| 4,210,738 | 7/1980 | Hermans | 526/119 |

FOREIGN PATENT DOCUMENTS

| 51-32493 | 3/1976 | Japan | 526/142 |
| 885869 | 12/1961 | United Kingdom | 526/153 |
| 1299863 | 12/1972 | United Kingdom | 526/901 |

*Primary Examiner*—Edward J. Smith
*Attorney, Agent, or Firm*—Fred Philpitt

[57] ABSTRACT

A process for producing α-olefin polymers is provided which comprises:

reacting an organoaluminum compound ($A_1$) with an electron donor ($B_1$) to obtain a reaction product (I);

reacting (I) with $TiCl_4$ to obtain a solid product (II);

reacting (II) with an electron donor ($B_2$) and an electron acceptor to obtain a solid product (III);

combining (III) with an organoaluminum compound ($A_2$) and a reaction product (G) of an organoaluminum ($A_3$) with an electron donor ($B_3$) ((III), ($A_2$) and (G) being referred to as catalyst components), and in this combination, subjecting a part or the whole of the catalyst components to polymerization treatment with an α-olefin at least in the presence of (III) and said ($A_2$) to obtain a preliminarily activated catalyst;

and polymerizing an α-olefin in the presence of the catalyst. According to this process, even in the case of gas phase polymerization, the resulting polymer has a uniform particle size; the catalyst employed has not only a high stability but also a high activity whereby the advantages of gas phase polymerization can be fully exhibited; and further it is possible to easily control the stereoregularity of polymer.

20 Claims, No Drawings

PROCESS FOR PRODUCING α-OLEFIN POLYMERS

BACKGROUND OF THE INVENTION

1. Field of the Invention

This invention relates to a process for producing α-olefin polymers by the use of a novel catalyst which is suitable for α-olefin polymerization, particularly gas phase polymerization, and further, as a modification of gas phase polymerization, a combination of slurry or bulk polymerization with gas phase polymerization.

2. Description of the Prior Art

It is well known that α-olefins are polymerized by the use of so-called Ziegler-Natta catalysts comprising a compound of transition metals of IV–VI Groups of the Periodic Table and an organometallic compound of metals of I–III Groups of the Table, including modified catalysts obtained by further adding an electron donor, etc. thereto. Among the catalysts, those comprising titanium trichloride as the component of transition metal compound have been most widely employed for obtaining highly crystalline polymers of e.g. propylene, butene-1, etc. Such titanium trichloride is classified into the following three kinds according to its preparation:

(1) A material obtained by reducing $TiCl_4$ with hydrogen, followed by milling with ball mill for activation, which material has been referred to as titanium trichloride (HA).

(2) A material obtained by reducing $TiCl_4$ with metallic aluminum, followed by milling with ball mill for activation, which material is expressed by the general formula $TiCl_3 \cdot \frac{1}{3}AlCl_3$ and has been referred to as titanium trichloride (AA).

(3) A material obtained by reducing $TiCl_4$ with an organoaluminum compound, followed by heat treatment.

However, since any of these titanium trichlorides have not been satisfactory enough, various improvements have been attempted and proposed. Among them, a process has been proposed wherein a titanium trichloride obtained by reducing $TiCl_4$ with an organoaluminum compound is treated with an electron donor and $TiCl_4$ whereby the catalyst activity is enhanced and the amount of amorphous polymer byproduced is reduced (e.g. Japanese patent application laid-open No. 34478/1972). However, the catalysts obtained according to these processes have a drawback that they are deficient in the heat stability.

Further, a process has been proposed wherein $TiCl_4$ and an organoaluminum compound are separately mixed with a definite amount of a complex-forming agent (electron donors being a kind thereof), to obtain two mixture liquids which are then mixed together and reacted to prepare a solid catalyst component (Japanese patent application laid-open No. 9296/1978). However, this process, too, has a drawback that the catalyst is deficient in the heat stability, as in the case of the above Japanese patent application laid-open No. 34478/1972.

Still further, a process wherein a uniform liquid material consisting of an organoaluminum compound and an ether is added to $TiCl_4$ or $TiCl_4$ is added to the former liquid to prepare a liquid material containing titanium trichloride (Japanese patent application laid-open No. 115797/1977), as well as a process wherein the above-mentioned liquid material is heated to a temperature of 150° C. or lower to precipitate a finely particulate titanium trichloride (Japanese patent application laid-open No. 47594/1977, etc.) have been proposed.

However, these processes, too, have a drawback that the catalysts are deficient in the heat stability.

On the other hand, as for processes for polymerizing α-olefins wherein Zeigler-Natta catalysts are employed but the phase of α-olefins is varied, slurry polymerization carried out in a solvent such as n-hexane, etc. (e.g. Japanese patent publication No. 10596/1957), bulk polymerization carried out in a liquefied α-olefin monomer such as liquefied propylene (e.g. Japanese patent publication Nos. 6686/1961, 14041/1963), and gas phase polymerization carried out in a gaseous monomer such as gaseous propylene (e.g. Japanese patent publication Nos. 14812/1964, 17487/1967, etc.), have been well known. Further, a process of bulk polymerization followed by gas phase polymerization has been also known (e.g. Japanese patent publication No. 14862/1974, Japanese patent application laid-open No. 135987/1976, etc.). Among these polymerization processes, gas phase one is advantageous in that recovery and reuse of solvent employed in polymerization as in the case of slurry polymerization process are unnecessary; recovery and reuse of liquefied monomer such as liquefied propylene as in the case of bulk polymerization process are unnecessary; hence the cost of solvent or monomer recovery is small to simplify the equipments for producing α-olefin polymers; etc. These gas phase polymerization processes, however, have had such disadvantages that since the monomer inside the polymerization vessel is present in vapor phase, the monomer concentration is relatively low as compared with those in slurry or bulk polymerization process, resulting in a lower reaction rate; thus, in order to increase the polymer yield per unit weight of catalyst, it has been necessary to extend the retention time and hence make the capacity of the reactor larger, and also, in order to enhance the catalyst activity, trialkylaluminums have been modified and used, resulting in reduction of the stereoregularity of polymer. In the case of gas phase polymerization process, however, uneven catalyst particles are liable to result in uneven polymer particles. This is, in turn, liable to cause cohesion of polymer particles and clogging of polymer-discharging port of polymerization vessel or transportation line, to make difficult its long time, stabilized, continuous operation and also make the quality dispersion of polymers larger.

The present inventors have previously invented a polymerization process free of the above-mentioned drawbacks even in the case of gas phase polymerization, that is, a process for producing α-olefin polymers using a catalyst prepared by reacting a reaction product of an electron donor with an organoaluminum compound, with $TiCl_4$, in the presence of an aromatic compound to form a solid product, or reacting this solid product further with an electron donor to form a solid product; and combining the solid product thus obtained, with an organoaluminum compound.

The inventors have further made studies, and as a result, have invented a process comprising reacting an organoaluminum compound with an electron donor to obtain a reaction product; reacting this reaction product with $TiCl_4$ to obtain a solid product; reacting this solid product with an electron donor and an electron acceptor to obtain another solid product; combining this solid product with an organoaluminum compound to obtain a catalyst; and polymerizing an α-olefin in the presence of this catalyst (this process will be hereinafter referred to as prior invention). According to this polymerization process, particularly in the case of gas phase polymerization in the presence of a catalyst obtained by subjecting the catalyst of the above-mentioned process to a preliminary activation with an α-olefin, a long time stabilized operation without forming any polymer lump has become possible even in the case of gas phase polymerization, but the polymer yield per g of the solid catalyst component was 5,000 to 6,000 g, i.e. the activity of the catalyst could not have been regarded as sufficient. Thus, the amount of catalyst employed could not have been reduced. If the amounts of alcohol, alkylene oxide, steam, etc. employed for killing of catalyst after production of α-olefin polymers or for purification of polymer are reduced too much, then corrosive substances remaining in polymer have often been not made unharmless, resulting in rusting of mold at the time of molding of polymer or harming the physical properties of polymer.

The present inventors further continued studies for improvement, and as a result have found that if an unknown catalyst component is combined with the catalyst employed in the prior invention, and in this combination, the resulting catalyst components are subjected to polymerization treatment with an α-olefin and employed for polymerization, then, even in the case of gas phase polymerization, no polymer lump is not only formed, but also the polymer yield can be sufficiently increased and polymer purification can be easily carried out; it is possible to produce polymer, particularly polypropylene, under control of its stereoregularity; and the rate of atactic polymer formed is low, and have attained the present invention.

SUMMARY OF THE INVENTION

The object of the present invention is to provide a process for producing α-olefin polymers wherein, even in the case of gas phase polymerization, the resulting polymer has a uniform particle size; the catalyst employed has not only a high stability but also a high activity whereby the advantages of gas phase polymerization can be fully exhibited; and further it is possible to easily control the stereoregularity of polymer.

The present invention resides briefly in:
a process for producing α-olefin polymers which comprises:
reacting an organoaluminum compound ($A_1$) with an electron donor ($B_1$) to obtain a reaction product (I);
reacting this reaction product (I) with $TiCl_4$ to obtain a solid product (II);
reacting this solid product (II) with an electron donor ($B_2$) and an electron acceptor (E) to obtain a solid product (III);
combining this solid product (III) with an organoaluminum compound ($A_2$) and a reaction product (G) of an organoaluminum ($A_3$) with an electron donor ($B_3$) (these three substances to be combined together will be hereinafter referred to as catalyst components), and in this combination, subjecting a part or the whole of the catalyst components to polymerization treatment with an α-olefin at least in the presence of said reaction product (III) and said aluminum compound ($A_2$) to obtain a preliminarily activated catalyst; and
polymerizing an α-olefin or α-olefins in the presence of this preliminarily activated catalyst.

The terms "polymerization treatment" referred to above means that a small amount of α-olefin is brought into contact with catalyst components under polymerizable conditions and said α-olefin is polymerized. By this polymerization treatment, the catalyst components are brought to a state coated with polymer.

DETAILED DESCRIPTION OF THE INVENTION

The process for preparing the catalyst employed in the present invention will be described below.

The preparation of the solid product (III) is carried out as follows:

An organoaluminum compound is first reacted with an electron donor to obtain a reaction product (I), which is then reacted with $TiCl_4$ to obtain a solid product (II), which is then further reacted with an electron donor and an electron acceptor to obtain a solid product (III).

The reaction of an organoaluminum compound (A) with an electron donor ($B_1$) is carried out in a solvent (D), at a temperature of $-20°$ to $200°$ C., preferably $-10°$ to $100°$ C. and for a time of 30 seconds to 5 hours. The addition order of (A), ($B_1$) and (D) has no limitation, and the proportion of the amounts thereof employed is suitably 0.1 to 8 mols, preferably 1 to 4 mols, of an electron donor and 0.5 to 5 l, preferably 0.5 to 2 l, of a solvent, per mol of an organoaluminum. Aliphatic hydrocarbons are preferable as the solvent. Thus a reaction product (I) is obtained. The reaction product (I) may be subjected to the subsequent reaction, in a state of liquid after completion of the reaction (which liquid will be hereinafter referred to as reaction liquid (I)), as it is, without separating the solid product (I).

The reaction of the reaction product (I) with $TiCl_4$ (C) is carried out at a temperature of $0°$ to $200°$ C., preferably $10°$ to $90°$ C., for 5 minutes to 8 hours. Although it is preferable to employ no solvent, aliphatic or aromatic hydrocarbons may be employed as solvent. Addition of (I), (C) and solvent may be carried out in any order, and mixing of the total amount is preferably completed within 5 hours. As for the amounts of them employed for the reaction, the amount of solvent is $0°$ to 3,000 ml per mol of $TiCl_4$, and the ratio (Al/Ti) of the number of Al atoms in (I) to that of Ti atoms in $TiCl_4$ is 0.05 to 10, preferably 0.06 to 0.2. After completion of the reaction, a liquid portion is separated and removed by filtration or decantation, followed by repeated washings with solvent to obtain a solid product (II), which may be employed in the next step in a state where it is suspended in solvent, as it is, or may be further dried to employ the resulting solid product in the next step.

The solid product (II) is then reacted with an electron donor ($B_2$) and an electron acceptor (E). Although this reaction may be carried out without employing any solvent, employment of aliphatic hydrocarbons yields preferable results. As for the amounts of them employed, 10 to 1,000 g, preferably 50 to 200 g of ($B_2$), 10 to 1,000 g, preferably 20 to 500 g of (E) and 0 to 3,000 ml, preferably 100 to 1,000 ml of solvent, each based on 100 g of the solid product (II) are employed. It is preferable to admix these 3 or 4 substances at a temperature of $-10°$ to $40°$ C. for a time of 30 seconds to 60 minutes and react them at a temperature of $40°$ to $200°$ C., preferably $50°$ to $100°$ C. for a time of 30 seconds to 5 hours. The order of addition of the solid product (II), ($B_2$), (E) and solvent has no particular limitation, ($B_2$) and (E) may be reacted together in advance of mixing them with the solid product (II). The reaction of (B$_2$) with (E) is carried out at a temperature of 10° to 100° C. for a time of 30 minutes to 2 hours, and the resulting product is cooled down to 40° C. or lower and employed. After completion of the reaction of the reaction product (II), (B$_2$) and (E), a liquid portion is separated and removed by filtration or decantation, followed by repeated washings to obtain a solid product (III), which is employed in the next step after dried and taken out as solid matter, or in a state where it is suspended in a solvent, as it is.

The solid product (III) thus obtained is combined with an organoaluminum compound (A$_2$), a reaction product (G) of an organoaluminum compound (A$_3$) with an electron donor (B$_3$) and an α-olefin (F) to effect a preliminary activation of catalyst, and at the same time, the reaction product (G) is adequately selected to obtain a polymer having its stereoregularity controlled.

The organoaluminum compounds employed in the present invention are expressed by the general formula AlR$_n$R'$_{n'}$X$_{3-(n+n')}$ wherein R and R' each represent a hydrocarbon group such as alkyl group, aryl group, alkaryl group, cycloalkyl group, etc. or alkoxy group; X represents a halogen such as fluorine, chlorine, bromine or iodine; and n and n' each represent an optional number of $0 < n+n' \leq 3$, and as concrete examples, trialkylaluminums such as trimethylaluminum, triethylaluminum, tri-n-propylaluminum, tri-n-butylaluminum, tri-i-butylaluminum, tri-n-hexylaluminum, tri-i-hexylaluminum, tri-2-methylpentylaluminum, tri-n-octylaluminum, tri-n-decylaluminum, etc., dialkylaluminum monohalides such as diethylaluminum monochloride, di-n-propylaluminum monochloride, di-i-butylaluminum monochloride, diethylaluminum monofluoride, diethylaluminum monobromide, diethylaluminum monoiodide, etc.; alkylaluminum hydrides such as diethylaluminum hydride; and alkylaluminum halides such as methylaluminum sesquichloride, ethylaluminum sesquichloride, ethylaluminum dichloride, i-butylaluminum dichloride, etc. are mentioned. Besides, alkoxyalkylaluminums such as monoethoxydiethylaluminum, diethoxymonoethylaluminum, etc. may be also employed. These organoaluminums may be employed in admixture of two or more kinds. The organoaluminum compounds (A$_1$), (A$_2$) and (A$_3$) may be the same or different.

As for the electron donors employed in the present invention, various kinds are illustrated below, but it is preferable for (B$_1$) and (B$_2$) that electron donors composed singly or mainly (more than 50% by mol based on the total mols thereof) of ethers be employed and those other than ethers be employed together with ethers. As for the electron donors employed, organic compounds containing at least one atom of oxygen, nitrogen, sulfur and phosphorus, such as ethers, alcohols, esters, aldehydes, fatty acids, aromatic acids, ketones, nitriles, amines, amides, urea, thiourea, isocyanates, azo compounds, phosphines, phosphites, phosphinites, thioethers, thioalcohols, etc. are mentioned. As for concrete examples, ethers such as diethyl ether, di-n-propyl ether, di-n-butyl ether, diisoamyl ether, di-n-pentyl ether, di-n-hexyl ether, di-i-hexyl ether, di-n-octyl ether, di-i-octyl ether, di-n-dodecyl ether, diphenyl ether, ethylene glycol monomethyl ether, diethylene glycol dimethyl ether, tetrahydrofuran; alcohols such as methanol, ethanol, propanol, butanol, pentanol, hexanol, octanol, phenol, cresol, xylenol, ethylphenol, naphthol; esters such as methyl methacrylate, ethyl acetate, butyl formate, amyl acetate, vinyl lactate, vinyl acetate, ethyl benzoate, propyl benzoate, butyl benzoate, octyl benzoate, 2-ethylhexyl benzoate, methyl toluylate, ethyl toluylate, 2-ethylhexyl toluylate, methyl anisate, ethyl anisate, propyl anisate, ethyl cinnamate, methyl naphthoate, ethyl naphthoate, propyl naphthoate, butyl naphthoate, 2-ethylhexyl naphthoate, ethyl phenylacetate; aldehydes such as acetaldehyde, benzaldehyde; fatty acids such as formic acid, acetic acid, propionic acid, lactic acid, oxalic acid, succinic acid, acrylic acid, maleic acid; aromatic acids such as benzoic acid; ketones such as methyl ethyl ketone, methyl isobutyl ketone, benzophenone; nitriles such as acetonitrile; amines such as methylamine, diethylamine, tributylamine, triethanolamine, β(N,N-dimethylamino) ethanol, pyridine, quinoline, α-picoline, N,N,N',N'-tetramethylhexaethylenediamine, aniline, dimethylaniline; amides such as formamide, hexamethyl phosphoric acid triamide, N,N,N',N',N"-pentamethyl-N'-β-dimethylaminoethyl phosphoric acid triamide, octamethylpyrophosphoroamide; ureas such as N,N,N',N'-tetramethylurea; isocyanates such as phenylisocyanate, toluylisocyanate; azo compounds such as azobenzene; phosphines such as ethylphosphine, triethylphosphine, tri-n-butylphosphine, tri-n-octylphosphine, triphenylphosphine, triphenylphosphine oxide; phosphites such as dimethylphosphite, di-n-octylphosphite, triethylphosphite, tri-n-butylphosphite, triphenylphosphite; phosphinites such as ethyldiethylphosphinite, ethyldibutylphosphinite, phenyldiphenylphosphinite; thioethers such as diethyl thioether, diphenyl thioether, methyl phenyl thioether, ethylene sulfide, propylene sulfide; and thioalcohols such as ethyl alcohol, n-propyl thioalcohol, thiophenol, are mentioned. These electron donors may be employed in admixture. The electron donor (B$_1$) for obtaining the reaction product (I), (B$_2$) to be reacted with the solid product (II) and (B$_{3L}$) for obtaining the solid product (G) may be the same or different, respectively.

The electron acceptors employed in the present invention are represented by halides of elements of III Group to VI Group of the Periodic Table. As concrete examples, anhydrous AlCl$_3$, SiCl$_4$, SnCl$_2$, SnCl$_4$, TiCl$_4$, ZrCl$_4$, PCl$_3$, PCl$_5$, VCl$_4$, SbCl$_5$, etc. are mentioned. They may be employed in admixture. TiCl$_4$ is most preferable.

As for the solvent, the following ones are employed: As aliphatic hydrocarbons, n-heptane, n-octane, i-octane, etc. are mentioned. Further, in place of the aliphatic hydrocarbons or together therewith, halogenated hydrocarbons such as carbon tetrachloride, chloroform, dichloroethylene, trichloroethylene, tetrachloroethylene, etc. may be also employed. As for aromatic compounds, aromatic hydrocarbons such as naphthalene, and as their derivatives, alkyl substitutes such as mesitylene, durene, ethylbenzene, isopropylbenzene, 2-ethylnaphthalene, 1-phenylnaphthalene, etc., and halides such as monochlorobenzene, o-dichlorobenzene, etc. are mentioned.

Next, the process of preliminary activation by employing a combination of the solid product (III) with an organoaluminum compound (A$_2$), a reaction product (G) of an organoaluminum compound (A$_3$) with an electron acceptor (B$_3$), and an α-olefin (F) will be mentioned below in detail.

The organoaluminum compounds (A$_1$), (A$_2$) and (A$_3$) may be the same or different. The most preferable (A$_1$), (A$_2$) and (A$_3$) are dialkylaluminum halides, dialkylaluminum halides and trialkylaluminums, respectively.

As for the α-olefin (F) employed for the preliminary activation, straight chain monoolefins such as ethylene, propylene, butene-1, hexene-1, heptene-1 and branched chain monoolefins such as 4-methyl-pentene-1, 2-methyl-pentene-1, 3-methyl-butene-1, and styrene, etc. are mentioned. These olefins may be the same as or different from α-olefins employed for polymerization, and may be employed in admixture.

The electron donor ($B_3$) employed for preparing the reaction product (G) is the same as those described in the reaction for obtaining the solid product (III), but is not necessary to be the same as that employed for obtaining the solid product (III). The reaction product (G) is usually obtained by reacting 1 mol of an organoaluminum compound with 0.01 to 5 mols of an electron donor in the presence of a solvent such as n-hexane, n-heptane, in an amount of 10 to 5,000 ml based on 1 g of the organo-aluminum and based on 1 g of the electron donor, at $-30°$ to $100°$ C. for 10 minutes to 3 hours. Usually, the reaction is carried out by dropwise adding the electron donor diluted with the solvent to the organoaluminum compound diluted with the solvent.

The preliminary activation may be carried out in a hydrocarbon solvent such as propane, butane, n-pentane, n-hexane, n-heptane, benzene, toluene, or in a liquefied α-olefin such as liquefied propylene, liquefied butene-1, or in an α-olefin gas such as ethylene gas, propylene gas. Further, hydrogen may be made coexistent in the preliminary activation.

The preliminary activation may be carried out by subjecting a part or the whole of the catalyst components of 1 g of the solid product (III), 0.1 to 500 g, preferably 0.5 to 50 g of an organoaluminum compound and 0.05 to 10 g of the reaction product (G), to polymerization treatment at least in the presence of the solid product (III) and the organoaluminum compound, with 0.01 to 5,000 g of an α-olefin. As for the conditions of the polymerization treatment, it is preferable that the temperature be in the range of $0°$ to $100°$ C., preferably $10°$ to $70°$ C., the time be in the range of one minute to 20 hours, and the α-olefin be polymerized in an amount of 0.01 to 2,000 g, preferably 0.05 to 200 g per g of the solid product (III). In the polymerization treatment, 10 l or less of hydrogen may be made present. In the preliminary activation, 50 l or less of a solvent may be employed.

In advance of the preliminary activation, polymer particles obtained by slurry, bulk or gas phase polymerization may be made coexistent. Such polymer may be the same as or different from α-olefin polymers as the object of polymerization. The amount of such polymer capable of being made coexistent may be in the range of 0 to 5,000 g per g of the solid product (III).

The solvent or α-olefin employed in the preliminary activation may be removed by distilling off, filtration or the like means, midway during the preliminary activation or after completion of the activation. Further, for suspending the solid product in a solvent of 80 l or less per g of the solid product, the solvent may be added.

For the preliminary activation, there are various methods. As for the main embodiments therefor, the following are illustrated:

(1) a method wherein solid product (III) is combined with organoaluminum compound ($A_2$), and α-olefin (F) is added to carry out polymerization treatment, followed by adding reaction product (G);

(2) a method wherein solid product (III) is combined with ($A_2$) in the presence of (F) to carry out polymerization treatment with (F), followed by adding (G);

(3) a method wherein solid product (III) is combined with ($A_2$), and (G) is added, followed by polymerization treatment with (F); and (4) a method wherein, after the procedure of the above (3), (G) is further added.

With regard to the methods (1) and (2) of preliminary activation, the following concrete methods are further illustrated:

(1-1) a method wherein solid product (III) is combined with ($A_2$) and the resulting combination is subjected to polymerization treatment with (F) in vapor phase or in liquefied α-olefin or in a solvent, followed by removing unreacted (F) or unreacted (F) and solvent and thereafter adding (G);

(1-2) a method wherein (G) is added without removing unreacted (F) or unreacted (F) and solvent, in (1-1);

(1-3) a method wherein (G) is added and thereafter unreacted (F) or unreacted (F) and solvent are removed, in (1-2);

(1-4) a method according to 1-1)–(1-3) wherein αolefin polymer obtained in advance is added;

(1-5) a method according to (1-1)–(1-4) wherein after preliminary activation, solvent or unreacted (F) and solvent are removed to obtain a catalyst in the form of powder;

(2-1) a method wherein ($A_2$) is combined with solid product (III) in the presence of propylene dissolved in a solvent or liquefied α-olefin or α-olefin gas, to carry out polymerization treatment with α-olefin, followed by adding (G);

(2-2) a method wherein (2-1) is carried out in the presence of α-olefin polymer obtained in advance; and (2-3) a method wherein after preliminary activation, unreacted (F) and solvent are removed under reduced pressure to obtain a catalyst in the form of powder.

In the methods (1) and (2), it is possible that a component obtained by subjecting a combination of solid product (III) with ($A_2$) to polymerization treatment with (F) is not mixed with (G) at the time of catalyst preparation, but they are mixed together just before polymerization. Further, in the methods (1)–(4), it is possible to employ hydrogen together with (F). Whether the catalyst is prepared in the form of slurry or in the form of powder affords no essential difference.

The preliminarily activated catalyst prepared as mentioned above is employed for producing α-olefin polymers. The polymerization may be carried out either by slurry polymerization in a hydrocarbon solvent or by bulk polymerization in liquefied α-olefin monomer, but, in the present invention, since the catalyst has a high activity, gas phase polymerization of α-olefins exhibits a particularly notable effectiveness, and slurry or bulk polymerization followed by gas phase polymerization as a modification of gas phase polymerization also exhibits a desirable effectiveness.

The gas phase polymerization of α-olefins may be carried out not only in the absence of solvent such as n-hexane, n-heptane, but also in a state where 0 to 500 g of solvent per Kg of α-olefin polymer is contained. Further it may be carried out either by continuous polymerization or batch polymerization. Furthermore, it may be carried out in fluidized bed manner, or in fluidized manner by way of agitating elements, or in stirring manner by way of vertical or horizontal type paddle.

As for the method of slurry or bulk polymerization followed by gas phase polymerization, of α-olefins, the following are illustrated: for example, in the case of batch polymerization, a method wherein α-olefin is polymerized in a solvent or liquefied α-olefin monomer, and thereafter the solvent or α-olefin monomer is removed so that it is contained in an amount of 500 g or less per Kg of polymer particles, followed by polymerizing α-olefin in vapor phase, and a method wherein polymerization of α-olefin is continued without removing the solvent or liquefied α-olefin, and moves into gas phase polymerization without adding any operation since the solvent or liquefied α-olefin is absorbed in the resulting polymer. A plural step polymerization consisting of a combination of slurry or bulk polymerization with gas phase polymerization exhibits a desirable result particularly in the case of continuous polymerization. This plural step polymerization may be carried out as follows: In the first step, slurry or bulk polymerization is carried out wherein the polymerization is continued so as to give a slurry concentration [(polymer (Kg))/(polymer (Kg)+solvent or liquefied α-olefin (Kg))+100%[ of 70% or higher, or the polymerization is carried out until a slurry concentration reaches 30 to 50%, and thereafter solvent or liquefied α-olefin is removed so as to give a slurry concentration of 70% or higher; and in the second step, α-olefin is subjected to vapor phase polymerization. In this method, the catalyst is added at the time of slurry or bulk polymerization of the first step, and in the gas phase polymerization successively carried out, the catalyst of the first step may be sufficiently employed as it is, but a fresh catalyst may be also added in the second step. As for the proportion of the weight of polymer formed by slurry or bulk polymerization and that of polymer formed by gas phase polymerization, it is preferable that the proportion be in the range of 0.1 to 100 parts by weight of polymer of gas phase polymerization based on one part of polymer of slurry or bulk polymerization.

The stereoregularity of polymer is controlled by varying the molar ratio of electron donor $(B_3)$ to organoaluminum $(A_3)$, of reaction product (G) (which will be hereinafter referred to as (G) molar ratio). The molar ratio is varied in the range of 0.01 to 5. Lower molar ratio results in lower stereoregularity, while higher molar ratio results in higher stereoregularity.

As for the polymerization conditions of α-olefins, any of slurry polymerization, bulk polymerization and gas phase polymerization may be carried out at a polymerization temperature of room temperature (20° C.) to 200° C., under a polymerization pressure of the atmospheric pressure (0 kg/cm$^2$G) to 50 kg/cm$^2$G and usually for 5 minutes to 10 hours. In the polymerization, addition of a suitable amount of hydrogen for adjustment of molecular weight, and the like means are carried out as in conventional manner.

As for the α-olefins employed in the polymerization of the present invention, straight chain monoolefins such as ethylene, propylene, butene-1, hexene-1, octene-1, etc., branched chain monoolefins such as 4-methyl-pentene-1, 2-methyl-pentene-1, 3-methyl-butene-1, etc., diolefins such as butadiene, isoprene, chloroprene, etc., styrene, etc. are mentioned. These olefins may be homopolymerized or copolymerized in combination with each other, for example, in combination of propylene with ethylene; butene with ethylene; and propylene with butene-1. In this case, they may be polymerized in admixture of monomers or in a plurality of steps where different α-olefins may be employed in the first step slurry or bulk polymerization and the second step gas phase polymerization.

The main effectiveness of the present invention consists in that even in the case of gas phase polymerization process where the monomer concentration is relatively low, a highly crystalline polymer having a good form of powder can be obtained with a high polymer yield, and also the stereo-regularity of polymer can be optionally controlled.

The effectiveness of the present invention will be further described in more detail.

The first effectiveness of the present invention is that the activity of the catalyst obtained is so high that a high polymer yield is, of course, obtained not only in the case of slurry or bulk polymerization, but also even in the case of gas phase polymerization where the monomer concentration is relatively low, that is, the polymer yield per g of solid product (III) in the case of gas phase polymerization amounts to 7,000 to 12,000 g (polymer).

The second effectiveness of the present invention is that since the polymer is obtained with a high yield, even if the amounts of alcohol, alkylene oxide, steam, etc. employed for killing the catalyst after production of α-olefin polymers or purifying the polymer are further reduced, polymer is not colored and has a yellowness index (YI) as low as 0 to 2.0; further, evolution of corrosive gas having a bad effect such as degradation of physical properties of polymer or rusting of mold at the time of molding of polymer does not occur: for example, even in the case where polymer is heated at 200° C., evolution of acidic gas changing the color of a testing paper of Congo Red is not observed.

The third effectiveness of the present invention is that the percentage of amorphous polymer formed at the time of production of α-olefin polymers, is reduced, and also such effectiveness is great particularly at the time of production of copolymer. For example, in the production of propylene polymer, the amount of isotactic polypropylene as n-hexane-insoluble (20° C.) reaches 98 to 99.8% in terms of isotactic index, and that of atactic polypropylene as n-hexane-soluble is only 0.2 to 2% in terms of atactic index. Thus, even when atactic polymer is not removed, disadvantages such as degradation of physical properties of polymer such as rigidity, heat stability, etc. are overcome, whereby removing step of atactic polymer can be omitted, resulting in simplification of production process of polymer.

The fourth effectiveness of the present invention is that it is possible to control the stereoregularity of polymer without increasing the amount of atactic polymer as n-hexane-soluble. For example, in the case of polypropylene, it is possible to optionally control the stereoregularity of homopolymer in the range of 0.88 to 0.96 in terms of absorbancy ratio of those at 995 cm$^{-1}$ to those at 974 cm$^{-1}$, measured by infrared absorption method (which ratio will be hereinafter expressed by IR-τ), and also the stereoregularity of copolymer in the range of 0.83 to 0.95, without increase in the amount of atactic polymer. Heretofore, when the stereoregularity of homopolymer has been reduced, or when copolymers have been produced, for improving the physical properties of molded product of polymer such as rigidity, impact strength, heat seal temperature, etc., the amount of atactic polymer has increased. Whereas according to the present invention, it has become possible to omit the removing step of atactic polymer and yet optionally control the stereoregularity of polymer depending on the application fields of polymer, in the production of polymer.

The fifth effectiveness of the present invention is that it is possible to optionally control the physical properties, particularly rigidity, of polymer in the range of 0.90 to $1.4 \times 10^4$ Kg/cm$^2$ in terms of bending modulus. Thus it is possible to easily provide polymers suitable for various application fields.

The sixth effectiveness of the present invention is that polymer particles having a good form are obtained and also the average particle size is small, that is, 90 to 99% of polymer is in a proportion of 32 to 60 meshes pass. The form of particles is close to sphere; the amounts of large particles and fine particles are reduced; and the particle size distiribution is narrow. Further, the bulk density (BD) of polymer is in the range of 0.45 to 0.52 and a small area of storage tank per unit weight of polymer may be sufficient; hence it is possible to make compact the plant for producing polymer; neither clogging trouble brought by cohesion of polymer particles nor transporting trouble brought about by fine particles occurs; hence even in the case of gas phase polymerization, it is possible to carry out a long time, stabilized operation.

The seventh effectiveness of the present invention is that storing stability and heat stability of catalyst are both high. Although this effectiveness has already been observed in the above-mentioned prior invention, the effectiveness is maintained as it is, in the present invention. For example, even when the solid product (III) is allowed to stand at a high temperature of about 30° C. for about 4 months, no large reduction in the polymerization activity occurs; hence no particular storing equipment such as that for storing solid product (III) while cooling it at about 0° C. is necessary, and even when the solid product (III) after combined with an organoaluminum, is allowed to stand in a high concentration of the solid product of 1.0% or higher, at 30° C. or higher, for about one week till polymerization is initiated, fine pulverization brought about by agitation in the catalyst tank hardly occurs, the form of polymer particles is not degraded, and no reduction in the polymerization activity is observed. This effectiveness is remarkably enhanced by preliminary activation with α-olefin. As a result, even when the catalyst is stored in the form of powder, reduction in the polymerization activity is small, the form of α-olefin polymers obtained by employing this catalyst is good; hence the merit of gas phase polymerization is exhibited.

EXAMPLE 1

(1) Preparation of solid product (III)

n-Hexane (60 ml), diethylaluminum monochloride (DEAC) (0.05 mol) and diisoamyl ether (0.12 mol) were mixed together at 25° C. for one minute and then reacted at the same temperature for 5 minutes, to obtain a reaction liquid (I) (molar ratio of diisoamyl ether/-DEAC:2.4). TiCl$_4$ (0.4 mol) was introduced into a reactor purged with nitrogen gas and heated to 35° C., and thereto was dropwise added the total amount of the above-mentioned reaction liquid (I) for 30 minutes, followed by maintaining the resulting material at the same temperature for 30 minutes, elevating the temperature to 75° C., further reaction for one hour, cooling down to room temperature, removing the supernatant, 4 times repeating a procedure of adding 400 ml of n-hexane and removing the supernatant by decantation, to obtain a solid product (II) (19 g). The total amount of this (II) was suspended in 300 ml of n-hexane, and to the resulting suspension were diisoamyl ether (16 g) and TiCl$_4$ (35 g) at 20° C. for about one minute, followed by reaction at 65° C. for one hour. After completion of the reaction, the resulting material was cooled down to room temperature (20° C.) and the supernatant was removed by decantation, followed by 5 times repeating a procedure of adding 400 ml of n-hexane, stirring for 10 minutes, still standing and removing the supernatant, and drying under reduced pressure, to obtain a solid product (III).

(2) Preparation of preliminarily activated catalyst

A 2 l capacity stainless steel reactor equipped with slant blades was purged by nitrogen gas, and into this reactor were added n-hexane (20 ml), diethylaluminum monochloride (420 mg) and the solid product (III) (30 mg) at room temperature. Thereafter 150 ml of hydrogen was introduced, and polymerization treatment was carried out by reacting them under a partial pressure of propylene of 5 Kg/cm$^2$G for 5 minutes (which polymerization treatment will be hereinafter abbreviated to reaction) (reacted propylene per g of solid product (III): 80.0 g), followed by removing unreacted propylene, hydrogen and n-hexane under reduced pressure, and thereafter adding a reaction product obtained by reaction in n-hexane (20 ml), triethylaluminum (85 mg) and hexamethylphosphoric acid triamide (110 mg) at 35° C. for 30 minutes, to obtain a preliminarily activated catalyst.

(3) Polymerization of propylene

Into the reactor containing the catalyst after completion of the preliminary activation was introduced 150 ml of hydrogen, and gas phase polymerization was carried out under a partial pressure of propylene of 22 kg/cm$^2$G, at a polymerization temperature of 70° C. for 2 hours. After completion of the reaction, 3 g of methanol was introduced and killing reaction was carried out at 70° C. for 10 minutes, followed by cooling down to room temperature (20° C.) and drying the resulting polymer, to obtain 303 g of polymer. The polymer yield per g of solid product (III) was 10,100 g, the isotactic index (n-hexane-insoluble at 20° C. (%)), 99.0, BD of polymer, 0.48, and the polymer particles were uniform and no lump was observed. No coloration of polymer was observed and yellowness index (YI) was 0.8. Further, in order to observe the extent of corrosiveness of polymer brought about by the extent of heat stability of catalyst after killing, polymer was heated to a definite temperature and whether acidic gas is easily or difficultly evolved was observed through the presence or absence of color change of Congo Red (according to JIS K-6723). As a result, no color change was observed.

COMPARATIVE EXAMPLE 1

Example 1 was repeated except that, in the preliminary activation of Example 1, after diethylaluminum monochloride was combined with solid product (III), hydrogen was added, followed only by reaction of propylene, and no reaction product of triethylaluminum with hexamethylphosphoric acid triamide was added. (Catalyst preparation which is different only in no addition of reaction product (G) of an organo-aluminum compound with an electron donor in the preliminary activation, and polymerization by the use of the thus prepared catalyst, as in the case of Comparative example 1 as compared with Example 1, will be hereinafter referred to as "Polymerization in the case of no addition of reaction product (G) in the corresponding Example" in the following Comparative examples.) The resulting polymerization activity was low.

COMPARATIVE EXAMPLE 2

Example 1 was repeated except that, in the preliminary activation of Example 1, after diethylaluminum monochloride and solid product (III) were added, reaction product of triethylaluminum with hexamethylphosphoric acid triamide was added without reacting propylene. As a result, polymer lump formed and the polymer yield did not increase.

COMPARATIVE EXAMPLE 3

Example 1 was repeated except that, in the preliminary activation of Example 1, triethylaluminum was not reacted with hexamethylphosphoric acid triamide, but they were separately added. As a result, the polymerization activity was low and the isotactic index was also low.

COMPARATIVE EXAMPLE 4

Example 1 was repeated except that, in the formation reaction of the reaction product (I) of Example 1, no diethylaluminum monochloride was employed.

COMPARATIVE EXAMPLE 5

Example 1 was repeated except that 0.12 mol (19 g) of diisoamyl ether to be employed in the formation reaction of solid product (I) of Example 1 was not employed, but it was instead added to 16 g of diisoamyl ether to be employed in the reaction with solid product (II).

COMPARATIVE EXAMPLE 6

Example 1 was repeated except that, in the formation reaction of solid product (III) of Example 1, diisoamyl ether was not reacted.

COMPARATIVE EXAMPLE 7

Example 1 was repeated except that a reaction material obtained by adding 0.05 mol of diethylaluminum monochloride to a solution consisting of 0.4 mol of $TiCl_4$ and 0.12 mol of diisoamyl ether and reacting them together, was employed in place of reaction product (II) of Example 1.

COMPARATIVE EXAMPLE 8

Example 1 was repeated except that solid product (II) of Example 1 was employed in place of solid product (III).

COMPARATIVE EXAMPLE 9

Example 1 was repeated except that, in the formation reaction of solid product (III) of Example 1, $TiCl_4$ was not employed in the reaction with solid product (II).

EXAMPLE 2 n-Heptane (80 ml), di-n-butylaluminum monochloride (0.10 mol) and di-n-butyl ether (0.30 mol) were mixed together at 30° C. for 3 minutes, followed by reaction for 20 minutes to obtain a reaction liquid (I). The total amount of this reaction liquid (I) was dropwise added over 60 minutes to a solution consisting of toluene (50 ml) and $TiCl_4$ (0.64 mol), maintained at 45° C. The temperature of the resulting mixture was elevated to 85° C. and reaction was further carried out for 2 hours, followed by cooling down to room temperature, removing the supernatant and twice repeating a procedure of adding 300 ml of n-heptane and removing the supernatant by decantation to obtain 49 g of solid product (II). The total amount of this (II) was suspended in 300 ml of n-heptane, and to the resulting suspension were added di-n-butyl ether (20 g) and $TiCl_4$ (150 g) at room temperature for about 2 minutes, followed by reaction at 90° C. for 2 hours, cooling, decantation, washing with n-heptane and drying to obtain a solid product (III). Thereafter, preliminary activation of catalyst and polymerization of propylene were carried out as in Example 1, (2) and (3).

COMPARATIVE EXAMPLE 10

Polymerization in the case of no addition of reaction product (G) in the corresponding Example 2 was carried out.

COMPARATIVE EXAMPLE 11

Example 2 was repeated except that solid product (II) of Example 2 was employed in place of solid product (III).

EXAMPLE 3

Example 1 was repeated except that the formation reaction of solid product (II) was carried out by dropwise adding reaction liquid (I) to $TiCl_4$ maintained at 12° C., at 12° C. for 45 minutes, and thereafter maintaining the resulting mixture at 35° C. for 60 minutes. The resulting solid product (III) had a brown color.

COMPARATIVE EXAMPLE 12

Polymerization in the case of no addition of reaction product (G) in the corresponding Example 3, was carried out.

EXAMPLE 4

Example 1 was repeated except that, in the formation reaction of solid product (II) of Example 1, the elevated temperature 75° C. after dropwise addition of reaction liquid (I) to $TiCl_4$, was changed to 65° C. The resulting solid product (III) had a brown color.

COMPARATIVE EXAMPLE 13

Polymerization in the case of no addition of reaction product (G) in the corresponding Example 4 was carried out.

EXAMPLE 5

Diethylaluminum monochloride (0.057 mol) and diisoamyl ether (0.15 mol) were dropwise added to n-hexane (40 ml) at 18° C. for 5 minutes, and reaction was carried out at 35° C. for 30 minutes. The resulting reaction liquid was dropwise added to $TiCl_4$ (0.5 mol) at 35° C. for 180 minutes, followed by further maintaining the resulting mixture at 35° C. for 60 minutes, elevating the temperature to 75° C., heating for 60 minutes, cooling down to room temperature (20° C.), removing the supernatant, and twice repeating a procedure of adding 400 ml of n-hexane and removing the supernatant by decantation to obtain 24 g of a solid product (II). The total amount of this product was suspended in 100 ml of n-hexane, and to the resulting suspension was added 12 g of diisoamyl ether, followed by reaction at 35° C., for one hour, adding diisoamyl ether (12 g) and $TiCl_4$ (72 g) at 35° C. for 2 minutes, elevating the temperature to 65° C., reaction for one hour, cooling down to room temperature (20° C.), decantation, washing with n-hexane and drying to obtain a solid product (III). Thereafter, preliminary activation and propylene polymerization were carried out as in Example 1.

COMPARATIVE EXAMPLE 14

Polymerization in the case of no addition of reaction product (G) in the corresponding Example 5, was carried out.

EXAMPLE 6

Example 5 was repeated except that, in the formation reaction of solid product (I), diisopropylaluminum monochloride (0.06 mol) was reacted with di-n-octyle ether (0.14 mol).

COMPARATIVE EXAMPLE 15

Polymerization in the case of no addition of reaction product (G) in the corresponding Example 6, was carried out.

EXAMPLE 7

Example 5 was repeated except that, in the formation reaction of solid product (II) of Example 5, the amount of TiCl$_4$ empoyed to be reacted with reaction product (I) was made 0.12 mol.

COMPARATIVE EXAMPLE 16

Polymerization in the case of no addition of reaction product (G) in the corresponding Example 7, was carried out.

EXAMPLE 8

Solid product (II) (24 g) obtained as in Example 5 was suspended in 200 ml of toluene, and to the resulting suspension were added TiCl$_4$ (10 g) and di-n-butyl ether (26 g), followed by reaction at 50° C. for 180 minutes, cooling down to room temperature (20° C.), decantation, washing with n-hexane and drying to obtain solid product (III). Subsequent preparation of preliminarily activated catalyst and propylene polymerization were carried out as in Example 1.

COMPARATIVE EXAMPLE 17

Polymerization in the case of no addition of reaction product (G) in the corresponding Example 8, was carried out.

EXAMPLE 9

Triisobutylaluminum (0.03 mol) and di-n-dodecyl ether (0.07 mol) were reacted together in n-hexane (100 ml) at 20° C. for 30 minutes. The resulting reaction liquid was dropwise added to TiCl$_4$ (0.15 mol) at 20° C. for 120 minutes, followed by maintaining the resulting mixture at 30° C. for 30 minutes, elevating the temperature to 50° C., reaction for 60 minutes, decantation of the supernatant, washing with n-hexane and drying to obtain a solid product (II) (23 g), which was then suspended in 50 ml of n-heptane. To the resulting suspension were added di-n-butyl ether (21 g) and TiCl$_4$ (40 g), followed by reaction at 50° C. for 140 minutes, cooling, decantation of the supernatant, washing with n-hexane and drying to obtain a solid product (III). The subsequent preparation of preliminarily activated catalyst and propylene polymerization were carried out as in Example 1.

COMPARATIVE EXAMPLE 18

Polymerization in the case of no addition of reaction product (G) in the corresponding Example 9, was carried out.

The results of Examples 1 to 9 and Comparative Examples 1 to 18 are shown in Table 1.

The terms "solid catalyst component" in this Table refer collectively to solid product (III), and solid product corresponding to solid product (III) as well as solid product (II) combined with organoaluminum, etc. and employed for polymerization in Comparative examples. This definition also applies to the succeeding Tables.

TABLE 1

| No. | Polymer yield per g of solid catalyst component (g) | Isotactic index | MFR[1] | YI[2] | Polymer BD | Proportion of 32 ~ 60 meshes pass (%) | 4 Meshes on (%) | Congo Red test[3] (time till color change) |
|---|---|---|---|---|---|---|---|---|
| Example 1 | 10,100 | 99.0 | 3.8 | 0.8 | 0.8 | 98.0 | 0 | unchanged |
| Comparative ex. 1 | 5,100 | 99.1 | 3.6 | 3.0 | 0.48 | 96.3 | 0 | 1 min. |
| Comparative ex. 2 | 2,200 | 99.0 | 3.8 | 7.4 | 0.31 | 12.0 | 14.0 | 30 sec. |
| Comparative ex. 3 | 5,300 | 89.0 | 3.6 | 3.5 | 0.42 | 90.0 | 0 | 2 min. |
| Comparative ex. 4 | 160 | 96.5 | 4.3 | >20 | 0.25 | 50.0 | 48 | 5 sec. |
| Comparative ex. 5 | 110 | — | — | — | — | — | — | — |
| Comparative ex. 6 | 3,000 | 98.0 | 4.1 | 7.6 | 0.40 | 49.0 | 18 | 1 min. |
| Comparative ex. 7 | 2,600 | 96.0 | 4.3 | 6.8 | 0.40 | 55.0 | 14 | 40 sec. |
| Comparative ex. 8 | 1,800 | 98.5 | 3.9 | 15.0 | 0.42 | 58.0 | 25 | 30 sec. |
| Comparative ex. 9 | 3,400 | 95.0 | 4.4 | 4.8 | 0.40 | 80.0 | 12 | 1 min. |
| Example 2 | 11,000 | 99.1 | 4.2 | 0.6 | 0.50 | 98.5 | 0 | unchanged |
| Comparative ex. 10 | 4,500 | 99.0 | 3.6 | 3.8 | 0.49 | 94.6 | 0 | 1 min. |
| Comparative ex. 11 | 3,300 | 98.4 | 4.1 | 5.6 | 0.40 | 79.0 | 18 | " |
| Example 3 | 11,300 | 99.0 | 4.1 | 0.5 | 0.50 | 98.5 | 0 | unchanged |
| Comparative ex. 12 | 4,400 | 99.1 | 4.2 | 3.7 | 0.49 | 96.5 | 0 | 1 min. |
| Example 4 | 10,780 | 98.5 | 3.1 | 0.6 | 0.49 | 97.0 | 0 | unchanged |

TABLE 1-continued

| No. | Polymer yield per g of solid catalyst component (g) | Isotactic index | MFR[1] | YI[2] | Polymer BD | Proportion of 32 ~ 60 meshes pass (%) | 4 Meshes on (%) | Congo Red test[3] (time till color change) |
|---|---|---|---|---|---|---|---|---|
| Comparative ex. 13 | 4,200 | 98.5 | 4.1 | 4.0 | 0.49 | 98.0 | 0 | 50 sec. |
| Example 5 | 11,900 | 99.0 | 3.6 | 0.4 | 0.50 | 97.6 | 0 | unchanged |
| Comparative ex. 14 | 5,100 | 99.0 | 3.8 | 3.1 | 0.49 | 96.7 | 0 | 1 min. |
| Example 6 | 10,500 | 98.6 | 3.1 | 0.8 | 0.50 | 98.6 | 0 | unchanged |
| Comparative ex. 15 | 4,200 | 98.4 | 3.6 | 4.0 | 0.46 | 90.0 | 0 | 40 sec. |
| Example 7 | 11,800 | 99.1 | 3.8 | 0.4 | 0.50 | 97.0 | 0 | unchanged |
| Comparative ex. 16 | 4,900 | 99.0 | 3.1 | 3.2 | 0.48 | 95.0 | 0 | 1 min. |
| Example 8 | 10,100 | 99.0 | 3.8 | 0.6 | 0.50 | 96.0 | 0 | unchanged |
| Comparative ex. 17 | 4,700 | 99.0 | 3.3 | 3.5 | 0.49 | 93.2 | 0 | 1 min. |
| Example 9 | 10,800 | 98.7 | 4.1 | 0.7 | 0.48 | 96.0 | 0 | unchanged |
| Comparative ex. 18 | 4,200 | 98.6 | 3.6 | 4.0 | 0.45 | 92.0 | 0 | 30 sec. |

Note
[1] Melt flow rate (according to ASTM D-1238(L))
[2] Yellowness index (according to JIS K7103)
[3] According to JIS K6723

EXAMPLE 10 n-Pentane (4 ml), diethylaluminum monochloride (160 mg), solid product (III) (32 mg) obtained in Example 1 and polypropylene powder (5 g) were introduced and mixed together, followed by removing n-pentane under reduced pressure. While the resulting material was fluidized with propylene gas under a partial pressure of propylene of 0.8 Kg/cm$^2$G, at 30° C. for 20 minutes, propylene was reacted in gas phase (reacted propylene per g of solid product (III): 1.8 g) followed by purging unreacted propylene, and adding a reaction product (G) obtained by reacting triethylaluminum (30 mg) with ethyl benzoate (41 mg) in n-pentane (10 ml) at 20° C. for 10 minutes to obtain a preliminarily activated catalyst. Thereafter gas phase polymerization of propylene was carried out as in Example 1, (3).

COMPARATIVE EXAMPLE 19

Polymerization in the case of no addition of reaction product (G) in the corresponding Example 10 was carried out.

EXAMPLE 11

Di-n-butylaluminum monochloride (120 mg) and solid product (III) (25 mg) obtained in Example 2 were introduced into propylene (30 g), followed by reaction under 9.8 Kg/cm$^2$G for 10 minutes (reacted propylene per g of solid product (III): 120 g). After purging unreacted propylene, a reaction product (G) obtained by reacting triisobutylaluminum (54 mg) with ethyl benzoate (30 mg) in n-hexane (18 ml) at 30° C. for 30 minutes was added to obtain a preliminarily activated catalyst. Thereafter gas phase polymerization of propylene was carried out as in Example 1, (3).

COMPARATIVE EXAMPLE 20

Polymerization in the case of no addition of reaction product (G) in the corresponding Example 11 was carried out.

EXAMPLE 12

Diethylaluminum monochloride (280 mg) and solid product (III) (25 mg) obtained in Example 2 were introduced into n-pentane (20 ml). Thereafter, while the partial pressure of propylene was elevated up to 5 Kg/cm$^2$G at 15° C. (rate of pressure elevation: 1 Kg/cm$^2$G/min.), propylene was reacted (reacted propylene per g of solid product (III): 3.2 g). After purging unreacted propylene, a reaction product (G) obtained by reacting triethylaluminum (23 mg) with methyl p-toluylate (18 mg) in n-pentane (20 ml) at 15° C. for 30 minutes was added to obtain a preliminarily activated catalyst. Thereafter gas phase polymerization of propylene was carried out as in Example 1, (3).

COMPARATIVE EXAMPLE 21

Polymerization in the case of no addition of reaction product (G) in the corresponding Example 12 was carried out.

EXAMPLE 13-15

Example 12 was repeated except that, in the preliminary activation of catalyst of Example 12, the following reaction products (G) were employed in place of reaction product of triethylaluminum with methyl p-toluylate:

EXAMPLE 13

Reaction product of triisobutylaluminum (84 mg) with N,N,N',N'-tetramethylhexaethylenediamine (90 mg)

EXAMPLE 14

Reaction product of diethylaluminum monochloride (24 mg), triethylaluminum (40 mg) and ethyl p-anisate (36 mg)

EXAMPLE 15

Reaction product of ethylaluminum dichloride (25 mg), triethylaluminum (75 mg) and N,N,N',N'-tetramethylurea (28 mg)

EXAMPLE 16

Example 12 was repeated except that, in the preparation of reaction product (G), diphenyl ether (34 mg) was employed in place of methyl p-toluylate.

EXAMPLE 17 n-Hexane (10 ml), diethylaluminum monochloride (210 mg) and solid product (III) (28 mg) obtained in Example 1 were introduced, and further a reaction product (G) obtained by reacting triethylaluminum (11 mg) with ethyl benzoate (15 mg) in n-hexane (20 ml) at 28° C. for 30 minutes was added, followed by removing n-hexane under reduced pressure. While the resulting material was fluidized with propylene under a partial pressure of propylene of 2 $Kg/cm^2G$ at 30° C. for 10 minutes, reaction was carried out in gas phase to obtain a preliminarily activated catalyst, followed by carrying out gas phase polymerization of propylene as in Example 1, (3).

COMPARATIVE EXAMPLE 22

Polymerization in the case of no addition of reaction product (G) in the corresponding Example 17 was carried out.

EXAMPLE 18

Propylene was in advance dissolved in n-hexane (100 ml) under a partial pressure of propylene of 2 $Kg/cm^2G$ at 50° C., and into the resulting solution were added diethylaluminum monochloride (180 mg), solid product (III) (20 mg) obtained in Example 1 and a reaction product (G) obtained by reacting triisobutylaluminum (18 mg) with methyl p-toluylate (24 mg) in n-hexane (10 ml) at 20° C. for one hour, followed by maintaining the partial pressure of propylene for 7 minutes so as to give 20 g of reacted propylene per g of solid product (III), purging unreacted propylene and removing n-hexane under reduced pressure. Thereafter gas phase polymerization of propylene was carried out as in Example 1, (3).

COMPARATIVE EXAMPLE 23

Polymerization in the case of no addition of reaction product (G) in the corresponding Example 18 was carried out.

EXAMPLE 19

Example 1 was repeated except that, in the preparation of preliminarily activated catalyst of Example 1, ethylene was reacted in place of propylene, under 1 $Kg/cm^2G$, at 35° C. for 10 minutes (reacted ethylene per g of solid produce (III): 2.4 g).

EXAMPLE 20

Example 1 was repeated except that, in the preparation of preliminarily activated catalyst of Example 1, butene-1 was reacted in place of propylene, under 0.5 $Kg/cm^2G$ at 35° C. for 10 minutes (reacted butene-1 per g of solid product (III): 0.3 g).

EXAMPLE 21

Example 1 was repeated except that diisopropylaluminum monochloride (380 mg) was employed in place of diethylaluminum monochloride, in Example 1, (2).

The results of Examples 10–21 and Comparative examples 19–23 are shown in Table 2.

TABLE 2

| No. | Polymer yield per g of solid catalyst component (g) | Isotactic index | MFR | YI | Polymer BD | Proportion of 32 ~ 60 meshes pass (%) | 4 Meshes on (%) | Congo Red test (time till color change) |
|---|---|---|---|---|---|---|---|---|
| Example 10 | 11,300 | 99.4 | 3.2 | 0.5 | 0.49 | 97.6 | 0 | No color change |
| Comparative ex. 19 | 5,100 | 99.3 | 4.3 | 2.9 | 0.48 | 90.8 | 0 | 1 min. |
| Example 11 | 10,900 | 99.0 | 3.6 | 0.8 | 0.49 | 92.5 | 0 | No color change |
| Comparative ex. 20 | 5,000 | 99.0 | 3.8 | 2.8 | 0.46 | 92.5 | 0 | 1 min. |
| Example 12 | 9,800 | 99.5 | 4.1 | 1.2 | 0.48 | 97.4 | 0 | No color change |
| Comparative ex. 21 | 4,600 | 98.8 | 3.4 | 3.5 | 0.49 | 93.0 | 0 | 1 min. |
| Example 13 | 9,600 | 98.9 | 3.2 | 1.4 | 0.49 | 96.0 | 0 | No color change |
| Example 14 | 9,200 | 98.9 | 4.1 | 1.3 | 0.48 | 95.6 | 0 | " |
| Example 15 | 9,100 | 99.0 | 4.2 | 1.4 | 0.49 | 97.4 | 0 | " |
| Example 16 | 9,000 | 98.5 | 4.1 | 1.6 | 0.48 | 96.0 | 0 | " |
| Example 17 | 9,900 | 99.1 | 4.2 | 1.0 | 0.49 | 95.3 | 0 | " |
| Comparative ex. 22 | 4,900 | 98.9 | 4.1 | 3.4 | 0.49 | 92.0 | 0 | 1 min. |
| Example 18 | 9,950 | 99.0 | 4.3 | 1.1 | 0.49 | 96.8 | 0 | No color change |
| Comparative ex. 23 | 5,100 | 98.9 | 4.3 | 3.1 | 0.49 | 93.0 | 0 | 1 min. |
| Example 19 | 9,100 | 98.5 | 3.2 | 1.1 | 0.46 | 92.0 | 0 | No color change |
| Example 20 | 9,400 | 98.8 | 3.6 | 1.0 | 0.47 | 96.0 | 0 | " |
| Example 21 | 9,900 | 99.1 | 3.4 | 0.6 | 0.48 | 96.0 | 0 | " |

EXAMPLE 22

After a preliminarily activated catalyst was obtained as in Example 12, 300 ml of hydrogen and then 600 g of propylene were introduced, and bulk polymerization was carried out at 70° C. under a partial pressure of propylene of 31 $Kg/cm^2g$, for 2 hours. After completion of the reaction, unreacted propylene was purged and post-treatment was carried out as in Example 1 to obtain a polymer.

EXAMPLE 23

After a preliminarily activated catalyst was obtained as in Example 12, 300 ml of hydrogen and then 200 g of propylene were introduced, and bulk polymerization was carried out at 60° C., under a partial pressure of propylene of 26 $Kg/cm^2G$ for 30 minutes to polymerize 35 g of propylene. Thereafter, while the resulting slurry containing unreacted propylene was flushed into a fluidized bed having a diameter of 20 cm and a volume of 20 l and equipped with agitating elements, and propylene was circulated at a flow rate of 5 cm/sec. at a reaction temperature of 70° C. under a partial pressure of propylene of 21 $Kg/cm^2G$, to fluidize polymer, gas phase polymerization was carried out for 2 hours. The subsequent post-treatment was carried out as in Example 1.

EXAMPLE 24

Bulk polymerization was carried out under 26 Kg/cm$^2$G, at 60° C. for 30 minutes as in Example 23. Thereafter, unreacted liquefied propylene was transferred to a separate feed tank connected to the reactor, and the temperature of the reactor was elevated to 72° C. While propylene was fed from the feed tank to the reactor so as to give a polymerization pressure of 26 Kg/cm$^2$G, gas phase polymerization was carried out for 2 hours. The subsequent post-treatment was carried out as in Example 1.

EXAMPLE 25

Bulk polymerization was carried out under 26 Kg/cm$^2$G at 60° C. for 30 minutes as in Example 23. Thereafter, when the polymerization temperature was elevated to 70° C., the polymerization pressure became 31 Kg/cm$^2$G. When the polymerization was continued as it was, the pressure lowered down to 26 Kg/cm$^2$G during 40 minutes; thus bulk polymerization moved continuously to gas phase polymerization. While propylene was fed so as to maintain the pressure at 26 Kg/cm$^2$G, gas phase polymerization was carried out for additional 60 minutes. The subsequent post-treatment was carried out as in Example 1 to obtain a polymer.

EXAMPLE 26 n-Hexane (1,000 ml), diethylaluminum monochloride (206 mg) and solid product (III) (18 mg) obtained in Example 2 were introduced into a reactor, and propylene was reacted under a partial pressure of propylene of 1.2 Kg/cm$^2$G, at 20° C., for 10 minutes (reacted propylene per g of solid product (III): 0.6 g). Thereafter, unreacted propylene was purged, and a reaction product (G) obtained by reacting triethylaluminum (23 mg) with methyl p-toluylate (24 mg) in n-hexane (20 ml), at 20° C. for 30 minutes, was added to obtain a preliminarily activated catalyst. Thereinto was 150 ml of hydrogen, and slurry polymerization was carried out under a partial pressure of propylene of 13 Kg/cm$^2$G at 70° C. for 3 hours, followed by removing n-hexane by steam stripping to obtain a polymer.

COMPARATIVE EXAMPLE 24

Polymerization in the case of no addition of reaction product (G) in Example 26 was carried out.

EXAMPLE 27

A preliminarily activated catalyst was obtained employing 80 ml of n-hexane in place of 1,000 ml thereof, in Example 26. Hydrogen (200 ml) was introduced, and slurry polymerization was carried out under a partial pressure of propylene of 10 Kg/cm$^2$G, at 70° C. for 60 minutes to polymerize 60 g of propylene (polymerized propylene per g of solid product (III): 3,300 g). The resulting slurry containing solvent and unreacted propylene was introduced into a fluidized bed equipped with agitating elements to carry out gas phase polymerization as in Example 23.

EXAMPLE 28 n-Hexane (200 ml), diethylaluminum monochloride (1.8 g) and solid product (III) (0.3 g) obtained in Example 2 were introduced into a fluidized bed equipped with agitating elements, and propylene was reacted under a partial pressure of propylene of 1.5 Kg/cm$^2$G, at 25° C. for 10 minutes (reacted propylene per g of solid product (III): 1.1 g). Further, a reaction product (G) obtained by reacting triethylaluminum (0.45 g) with methyl p-toluylate (0.36 g) in n-hexane (80 ml) at 20° C. for 5 hours was added to obtain a preliminarily activated catalyst. Hydrogen (3,000 ml) was introduced, and propylene was reacted under a partial pressure of propylene of 21 Kg/cm$^2$G at 70° C. under its circulation at a rate of 5 cm/sec. Initially slurry polymerization was carried out, but after one hour (polymerized propylene per g of solid product (III): 5,200 g), polymer began to cause fluidization, and gas phase polymerization was carried out for additional one hour. After polymerization, post-treatment was carried out as in Example 1 to obtain a polymer.

COMPARATIVE EXAMPLE 25

Polymerization in the case of no addition of reaction product (G) in Example 28 was carried out.

EXAMPLE 29

Solid product (III) obtained as in Example 1 was stored at 30° C. for 4 months. Thereafter, propylene was polymerized as in Example 1 (2) and (3).

EXAMPLE 30

A preliminarily activated catalyst obtained as in Example 12 was allowed to stand with stirring at 30° C. for one week, followed by polymerizing propylene as in Example 12.

COMPARATIVE EXAMPLE 26

Catalyst preparation was carried out as in Example 12 except that after diethylaluminum monochloride and solid product (III) were introduced into n-pentane, propylene was not reacted. Thereafter the catalyst was allowed to stand with stirring at 30° C. for one week, followed by polymerizing propylene as in Example 12. Polymerization activity was notably reduced; also polymer BD was reduced; and polymer lump formed.

The results of Examples 22–30 and Comparative examples 24–26 are shown in Table 3.

TABLE 3

| No. | Polymer yield per g of solid catalyst component (g) | Isotactic index | MFR | YI | Polymer BD | Proportion of 32 ~ 60 meshes pass (%) | 4 Meshes on (%) | Congo Red test (time till color change) |
|---|---|---|---|---|---|---|---|---|
| Example 22 | 10,200 | 99.0 | 3.8 | 0.4 | 0.48 | 97.0 | 0 | No color change |
| Example 23 | 11,000 | 98.8 | 3.2 | 0.3 | 0.49 | 96.8 | 0 | " |
| Example 24 | 10,800 | 98.9 | 2.6 | 0.4 | 0.48 | 93.0 | 0 | " |
| Example 25 | 10,600 | 98.9 | 3.8 | 0.6 | 0.49 | 96.0 | 0 | " |
| Example 26 | 8,800 | 99.3 | 4.1 | 1.4 | 0.50 | 97.4 | 0 | " |
| Comparative ex. 24 | 4,200 | 99.0 | 4.4 | 4.0 | 0.48 | 92.0 | 0 | 30 sec. |
| Example 27 | 9,900 | 99.4 | 3.8 | 1.0 | 0.49 | 96.8 | 0 | No color change |

TABLE 3-continued

| No. | Polymer yield per g of solid catalyst component (g) | Isotactic index | MFR | YI | Polymer BD | Proportion of 32 ~ 60 meshes pass (%) | 4 Meshes on (%) | Congo Red test (time till color change) |
| --- | --- | --- | --- | --- | --- | --- | --- | --- |
| Example 28 | 10,050 | 99.6 | 4.2 | 0.4 | 0.50 | 96.9 | 0 | " |
| Comparative ex. 25 | 5,100 | 99.0 | 4.2 | 3.2 | 0.49 | 95.0 | 0 | 1 min. |
| Example 29 | 8,800 | 99.0 | 3.2 | 1.2 | 0.48 | 97.6 | 0 | No color change |
| Example 30 | 8,100 | 99.0 | 3.1 | 1.6 | 0.46 | 93.0 | 0 | " |
| Comparative ex. 26 | 2,430 | 92.0 | 4.5 | 16 | 0.21 | 10.0 | 25 | 30 sec. |

EXAMPLE 31

Employing the catalyst obtained in Example 1, ethylene polymerization was carried out under a partial pressure of hydrogene of 12 Kg/cm$^2$G and a partial pressure of ethylene of 12 Kg/cm$^2$G, at 85° C.

EXAMPLE 32

A polymer (propylene-ethylene block copolymer) was obtained as in Example 27 except that the slurry polymerization of the first step was carried out with propylene, and the gas phase polymerization of the second step was carried out with ethylene under a partial pressure of hydrogen of 8 Kg/cm$^2$ and a partial pressure of ethylene of 12 Kg/cm$^2$G at 70° C. for 2 hours.

EXAMPLE 33

A polymer (propylene-ethylene copolymer) was obtained as in Example 23 except that an olefin mixture of 200 g of propylene with 20 g of ethylene was employed in place of 200 g of propylene.

EXAMPLE 34

A polymer (propylene-butene-1 copolymer) was obtained as in Example 33 except that 30 g of butene-1 was employed in place of 20 g of ethylene.

EXAMPLE 35

Employing a preliminarily activated catalyst obtained as in Example 1, (1) and (2) except that 320 mg of triethylaluminum was employed in place of diethylaluminum monochloride in Example 1 (2), ethylene polymerization was carried out as in Example 31.

EXAMPLE 36

Diethylaluminum monochloride (941 mg), solid product (III) 480 mg) obtained in Example 1 and a reaction product (G) (132 mg) ((G) molar ratio:0.30) obtained by reacting triethylaluminum (95 mg) (0.83 mmol) with methyl p-toluylate (37 mg) (0.25 mmol) in n-hexane (300 ml) at 28° C. for one hour, were added to n-hexane (500 ml), and propylene was reacted under a partial pressure of propylene of 2 Kg/cm$^2$G at 35° C. for 10 minutes (reacted propylene per g of solid product (III): 17 g), followed by purging unreacted propylene to obtain a preliminarily activated catalyst. Successively, 3,900 ml of hydrogen was introduced, and while ethylene was fed at a rate of 1.6 g/min. under a partial pressure of propylene of 22 Kg/cm$^2$G, propylene-ethylene copolymerization was carried out at 60° C. for 120 minutes. Ethylene content in the polymer was 3.4%.

COMPARATIVE EXAMPLE 27

Polymerization in the case of no addition of reaction product (G) in Example 36 was carried out.

COMPARATIVE EXAMPLES 28-30

Example 36 was repeated except that, in the preliminary activation of Example 36, triethylaluminum (95 mg) (0.83 mmol) (Comparative example 28) or methyl p-toluylate (37 mg) (0.25 mmol) (Comparative example 29) was employed in place of reaction product (G), or triethylaluminum (95 mg) was not reacted with methyl p-toluylate (37 mg), but they were separately and at the same time added (Comparative example 30). In any of these cases, atactic polymer increased.

COMPARATIVE EXAMPLE 31

Example 36 was repeated except that, in the preparation of the preliminarily activated catalyst, no propylene was reacted. Polymer lump formed and polymer yield did not increase.

EXAMPLE 37

Example 36 was repeated except that ethylene was fed at a rate of 2.3 g/min. Ethylene content in polymer was 5.1%.

The results of Examples 31 and 37 and Comparative examples 27-31 are shown in Table 4.

TABLE 4

| No. | Polymer yield per g of solid catalyst component (g) | Ethylene content in polymer (%) | Isotactic index | MFR | YI | Polymer BD | Proportion of 32 ~ 60 meshes pass (%) | 4 Meshes on (%) | Congo Red test (time till color change) |
| --- | --- | --- | --- | --- | --- | --- | --- | --- | --- |
| Example 31 | 8,300 | — | — | 2.6 | 1.8 | 0.46 | 90.0 | 0 | No color change |
| Example 32 | 10,100 | — | 98.5 | 3.6 | 0.6 | 0.49 | 93.0 | 0 | No color change |
| Example 33 | 11,200 | — | 98.5 | 3.1 | 0.3 | 0.50 | 93.4 | 0 | No color change |
| Example 34 | 11,300 | — | 98.8 | 3.2 | 0.4 | 0.48 | 93.6 | 0 | No color change |
| Example 35 | 9,200 | — | — | 2.8 | 0.9 | 0.47 | 97.0 | 0 | No color change |
| Example 36 | 11,000 | 3.4 | 98.5 | 4.1 | 0.4 | 0.46 | 96.0 | 0 | No color change |

TABLE 4-continued

| No. | Polymer yield per g of solid catalyst component (g) | Ethylene content in polymer (%) | Isotactic index | MFR | YI | Polymer BD | Proportion of 32 ~ 60 meshes pass (%) | 4 Meshes on (%) | Congo Red test (time till color change) |
| --- | --- | --- | --- | --- | --- | --- | --- | --- | --- |
| Comparative ex. 27 | 5,100 | 3.3 | 97.8 | 4.0 | 3.0 | 0.42 | 92.0 | 0 | one min. |
| Comparative ex. 28 | 5,800 | 3.2 | 84.0 | 4.1 | 3.2 | 0.21 | 12.0 | 12 | " |
| Comparative ex. 29 | 4,200 | 3.4 | 94.0 | 4.2 | 4.1 | 0.42 | 95.0 | 0 | " |
| Comparative ex. 30 | 4,100 | 3.5 | 90.0 | 4.1 | 4.4 | 0.35 | 22.0 | 8 | " |
| Comparative ex. 31 | 2,200 | 3.6 | 92.0 | 4.1 | 8.9 | 0.28 | 18.0 | 14 | 30 sec. |
| Example 37 | 10,800 | 5.1 | 98.0 | 4.1 | 0.2 | 0.42 | 96.0 | 0 | No color change |

EXAMPLE 38

Triethylaluminum (0.07 mol) was mixed with di-n-propyl ether (0.15 mol) in n-octane (45 ml) at 20° C. for 2 minutes and then they were reacted together at the same temperature for 30 minutes to obtain a solid product (I), which was then dropwise added to $TiCl_4$ (0.6 mol) at 32° C. over 4 hours, followed by maintaining the temperature at 35° C. for one hour, further elevating the temperature to 78° C., reacting for 2 hours, cooling down to room temperature (20° C.), removing the supernatant, 5 times repeating a procedure of adding 400 ml of n-hexane and removing the supernatant by decantation, confirming that $TiCl_4$ was not detected in the decanted liquid, filtration and drying to obtain 23 g of a solid product (II).

Di-n-pentyl ether (47 ml) and anhydrous $AlCl_3$ (5 g) were added to n-heptane (300 ml) and they were reacted together at 80° C. for 2 hours to dissolve anhydrous $AlCl_3$, followed by cooling down to 30° C., adding the above-mentioned solid product (II) (23 g), reaction at 80° C., for 2 hours, cooling down to room temperature, removing the supernatant by decantation, 3 times repeating a procedure of adding 300 ml of n-hexane and removing the supernatant by decantation, filtration and drying to obtain a solid product (III). The subsequent preliminary activation of catalyst and propylene polymerization were carried out as in Example 1, (2) and (3).

EXAMPLE 39

In place of the reaction of reaction product (II) with diisoamyl ether and $TiCl_4$ in Example 1, diisoamyl ether (38 g), $SiCl_4$ (12 g) and $TiCl_4$ (17 g) were added to n-hexane (200 ml) at room temperature (20° C.) for about one minute, followed by adding solid product (II) (19 g), reaction at 75° C. for 2 hours, washing with n-hexane and drying to obtain a solid product (III). The subsequent preliminary activation of catalyst and propylene polymerization were carried out as in Example 1, (2) and (3).

COMPARATIVE EXAMPLE 31

Example 1 was repeated except that, in the preparation of solid product (III), after the reaction of $TiCl_4$ with reaction product (I), the supernatant was not removed, but n-hexane was added so as to give 300 ml, and the resulting liquid was employed in place of the suspension of solid product (II), for the subsequent reaction with diisoamyl ether and $TiCl_4$.

COMPARATIVE EXAMPLE 32

Example 1 was repeated except that, in the preparation of solid product (III) of Example 1, n-hexane (60 ml) and diethylaluminum monochloride (0.05 mol) were added to a solution consisting of $TiCl_4$ (0.4 mol) and diisoamyl ether (0.12 mol), at 35° C. for 30 minutes, followed by maintaining the temperature at the same one for 30 minutes, elevating the temperature to 75° C., reaction for additional one hour, cooling down to room temperature, and washing with n-hexane, to obtain 19 g of a solid product, which was employed in place of solid product (II).

The results of Examples 38 and 39 and Comparative examples 31 and 32 are shown in Table 5.

TABLE 5

| No. | Polymer yield per g of solid catalyst componrnt (g) | Isotactic index | MFR | YI | Polymer BD | Proportion of 32 ~ 60 meshes pass (%) | 4 Meshes on (%) | Congo Red test (time till color change) |
| --- | --- | --- | --- | --- | --- | --- | --- | --- |
| Example 38 | 9,800 | 99.0 | 3.8 | 0.6 | 0.50 | 98.0 | 0 | No color change |
| Example 39 | 10,200 | 99.0 | 3.2 | 0.4 | 0.50 | 96.0 | 0 | " |
| Comparative example 31 | 3,600 | 98.0 | 3.8 | 5.0 | 0.44 | 50.0 | 25.0 | 30 sec. |
| Example 32 | 4,400 | 97.8 | 3.2 | 4.0 | 0.44 | 55.0 | 26.0 | " |

EXAMPLE 40

Into a stainless steel reactor equipped with slant blades, were introduced n-hexane (800 ml), diethylaluminum monochloride (2,880 mg) and solid product (III) (540 mg) obtained in Example 1, at 20° C. and propylene was reacted under a partial pressure of propylene of 1.5 $Kg/cm^2G$ at 20° C. for 7 minutes (reacted propylene per g of solid product (III): 14 g), followed by purging unreacted propylene, and adding reaction product (G) (419 mg), obtained by reacting triethylaluminum (181 mg) (1.59 mmol) with methyl p-toluylate (238 mg) (1.59 mmol) ((G) molar ratio: 1.0) in n-hexane (200 ml) at 20° C. for 3 hours, to obtain a preliminarily activated catalyst. Successively, hydrogen (7,200 ml) was introduced, and gas phase polymerization was carried out under a partial pressure of propylene of 22 Kg/cm²G, at a polymerization temperature of 70° C. for 2 hours, followed by adding 48 g of methanol, killing reaction at 70° C. for one hour, cooling down to room temperature (20° C.) and drying to obtain a polymer.

This polymer was pressed at 200° C. under 10 Kg/cm²G for 3 minutes to obtain a film, which was then water-cooled, annealed at 135° C. for 120 minutes and subjected to measurement of IR-$\tau$ according to Luongo's method (see J. P. Luongo, J. Appl. Polymer Sci., 3, 302 (1960)) and also to measurement of bending modulus according to JIS K-7203. Further, other measurement values were obtained as in Example 1.

EXAMPLES 41–44

Example 40 was repeated except that the amount of methyl p-toluylate employed was varied as follows:

| Example 41 | 477 mg (3.18 mmol) | ((G) molar ratio 2.0, amount of (G) 658 mg) |
| Example 42 | 119 mg (0.79 mmol) | ((G) molar ratio 0.50, amount of (G) 300 mg) |
| Example 43 | 60 mg (0.4 mmol) | ((G) molar ratio 0.25, amount of (G) 241 mg) |
| Example 44 | 36 mg (0.24 mmol) | ((G) molar ratio 0.15, amount of (G) 217 mg) |

COMPARATIVE EXAMPLE 33

Example 40 was repeated except that no reaction product (G) wad added in the catalyst preparation.

COMPARATIVE EXAMPLE 34

Example 40 was repeated except that triethylaluminum (181 mg) (1.59 mmol) was employed in place of reaction product (G), in the catalyst preparation. Atactic polymer increased.

COMPARATIVE EXAMPLES 35–39

Example 40 was repeated except that, in the catalyst preparation, the following various amounts of methyl p-toluylate were employed in place of reaction product (G):

| Comparative ex. 35 | 477 mg (3.18 mmol) |
| Comparative ex. 36 | 238 mg (1.59 mmol) |
| Comparative ex. 37 | 119 mg (0.79 mmol) |
| Comparative ex. 38 | 60 mg (0.4 mmol) |
| Comparative ex. 39 | 36 mg (0.24 mmol) |

IR-$\tau$s and bending moduli were unchanged.

The results of Examples 40–44 and Comparative examples 33–39 are shown in Table 6.

TABLE 6

| No. | Polymer yield per g of solid catalyst component (g) | Isotactic index | IR-$\tau$ | Bending modulus $\times 10^4$Kg/cm² | MFR | YI | Polymer BD | Proportion of 32 ~ 60 meshes pass (%) | 4 Meshes on (%) | Congo Red test (time till color change) |
|---|---|---|---|---|---|---|---|---|---|---|
| Example 40 | 11,300 | 99.2 | 0.94 | 1.4 | 4.1 | 0.4 | 0.50 | 98.0 | 0 | No color change |
| Example 41 | 10,100 | 99.0 | 0.96 | 1.5 | 4.2 | 0.6 | 0.50 | 96.5 | 0 | No color change |
| Example 42 | 11,500 | 99.5 | 0.93 | 1.3 | 4.1 | 0.3 | 0.49 | 98.1 | 0 | No color change |
| Example 43 | 11,700 | 99.0 | 0.91 | 1.1 | 4.2 | 0.2 | 0.49 | 98.2 | 0 | No color change |
| Example 44 | 11,900 | 99.0 | 0.88 | 0.90 | 4.1 | 0.1 | 0.49 | 98.5 | 0 | No color change |
| Comparative example 33 | 5,050 | 99.0 | 0.93 | 1.3 | 4.0 | 3.5 | 0.48 | 96.0 | 0 | Color change in one min. |
| Comparative example 34 | 6,100 | 89.0 | 0.86 | 0.90 | 4.1 | 3.0 | 0.35 | 42.0 | 12 | Color change in 5 min. |
| Comparative example 35 | 3,300 | 99.0 | 0.94 | 1.4 | 4.0 | 12 | 0.48 | 95.0 | 0 | Color change in 1 min. |
| Comparative example 36 | 4,300 | 99.0 | 0.94 | 1.4 | 4.1 | 6.0 | 0.48 | 96.0 | 0 | Color change in 1 min. |
| Comparative example 37 | 4,800 | 99.2 | 0.94 | 1.4 | 4.2 | 4.0 | 0.48 | 96.2 | 0 | Color change in 1 min. |
| Comparative example 38 | 4,900 | 99.0 | 0.94 | 1.4 | 4.1 | 4.1 | 0.48 | 96.0 | 0 | Color change in 1 min. |
| Comparative example 39 | 5,100 | 99.0 | 0.94 | 1.4 | 4.2 | 3.8 | 0.48 | 95.8 | 0 | Color change in 1 min. |

What is claimed is:

1. A process for producing $\alpha$-olefin polymers which comprises:
  (a) reacting one mol of an organoaluminum compound (A₁) with 0.1 to 8 mols of an electron donor (B₁) in a solvent at a temperature of −20° to 200° C., to obtain a solid product (I);
  (b) reacting this solid product (I) with TiCl₄ in a ratio (Al/Ti) of the number of atoms of aluminum to that of Ti in TiCl₄ of 0.05 to 10, at a temperature of 0° to 200° C., and thereafter removing the resulting liquid portion and TiCl₄ freed by washing, to obtain a solid product (II);
  (c) reacting 100 g of this solid product (II) with 10 to 1,000 g of an electron donor (B₂) and 10 to 1,000 g of an electron acceptor at a temperature of 40° to 200° C., to obtain a solid product (III);
  (d) combining 1 g of said solid product (III) with 0.1 to 500 g of an organoaluminum compound (A₂) and subjecting said combination to polymerization treatment with 0.01 to 5,000 g of an $\alpha$-olefin,
  (e) adding to said 1 g of solid product (III) and said 0.1 to 500 g of organoaluminum compound (A₂) (either prior to or subsequent to said polymerization treatment with 0.01 to 5,000 g of an $\alpha$-olefin) 0.05 to 10 g of a reaction product (G) obtained by reacting
    (1) 1 mol of an organoaluminum compound (A₃) with (2) 0.01 to 5 mols of an electron donor (B$_3$)
(3) such reaction being carried out at a temperature of $-30°$ to $100°$ C., to thereby establish a preliminary activated cataly (f) polymerizing an α-olefin or α-olefins in the present this preliminarily activated catalyst.

2. A process according to claim 1 wherein the reaction temperature in step (b) is 10 to 90° C.

3. A process according to claim 1 or 2 wherein said polymerization is carried out by gas phase polymerization.

4. A process according to claim 1 or 2 wherein said polymerization is carried out by slurry polymerization followed by gas phase polymerization.

5. A process according to claim 1 or 2 wherein said polymerization is carried out bulk polymerization followed by gas phase polymerization.

6. A process according to claim 1 or 2 said organoaluminum compounds (A$_1$), (A$_2$) and (A$_3$) may be the same or different and are expressed by the general formula:

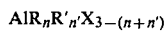

wherein R and R' each represent an alkyl, aryl, alkaryl, cycloalkyl or alkoxy group; X represents fluorine, chlorine, bromine or iodine; and n and n' each represent an optional number of $0<n+n'\leq 3$.

7. A process according to claim 1 or 2 wherein said electron donors (B$_1$), (B$_2$) and (B$_3$) may be the same or different and each are one or more members selected from the group consisting of ethers, alcohols, esters, aldehydes, fatty acids, aromatic acids, ketones, nitriles, amines, amides, urea, thiourea, isocyanates, azo compounds, phosphines, phosphites, phosphinites, thioethers and thioalcohols.

8. A process according to claim 1 or 2 wherein (B$_1$) and (B$_2$) are each composed mainly of ethers, and electron donors other than ethers are employed together with ethers.

9. A process according to claim 1 or 2 wherein said electron acceptor is one or more members selected from the group consisting of anhydrous AlCl$_3$, SiCl$_4$, SnCl$_2$, SnCl$_4$, TiCl$_4$, ZrCl$_4$, PCl$_3$, PCl$_5$, VCl$_4$ and SbCl$_5$.

10. A process according to claim 1 or 2 wherein said solvent is an aliphatic hydrocarbon.

11. A process according to claim 1 or 2 wherein said reaction of said reaction product (II) with said electron donor (B$_2$) and said electron acceptor is carried out in an aliphatic hydrocarbon.

12. A process according to claim 1 or 2 wherein said reaction of said reaction product (II) with said electron donor (B$_2$) and said electron acceptor is carried out by reacting, in advance, said electron donor (B$_2$) with said electron acceptor at a temperature of 10° to 100° C. for 30 minutes to 2 hours, cooling the resulting reaction product down to 40° C. or lower and reacting this reaction product with said reaction product (II).

13. A process according to claim 1 or 2 wherein said preparation of preliminarily activated catalyst according to steps (d) and (e) is carried out by combining said solid product (III) with said organoaluminum compound (A$_2$), subjecting the resulting combination to polymerization treatment with an α-olefin and thereafter adding said reaction product (G).

14. A process according to claim 1 or 2 wherein said preparation of preliminarily activated catalyst according to steps (d) and (e) is carried out by combining said solid product (III) with said organoaluminum compound (A$_2$) in the presence of an α-olefin to thereby subject the former both to polymerization treatment with said α-olefin, and thereafter adding said reaction product (G).

15. A process according to claim 13 wherein the material obtained by said polymerization treatment and consisting of said solid product (III), said organoaluminum compound (A$_2$) and a polymer of said α-olefin, and said solid product (G) are separately stored and mixed together just before the polymerization of step (f) and employed as the catalyst therefor.

16. A process according to claim 1 or 2 wherein said preparation of preliminary activated catalyst according to steps (d) and (e) is carried out by combining said solid product (III) with said organoaluminum compound (A$_2$), adding the resulting combination to said solid product (G), and thereafter subjecting the mixture to polymerization treatment with 0.01–5,000 g of an α-olefin.

17. A process according to claim 1 or 2 wherein said preparation of preliminarily activated catalyst according to steps (d) and (e) is carried out by combining said solid product (III) with said organoaluminum compound (A$_2$), adding the resulting combination to part of said reaction product (G), subjecting the resulting mixture to polymerization treatment with an 0.01–5,000 g of an α-olefin and thereafter further adding the remainder of said reaction product (G) to the thus treated material.

18. A process according to claim 1 or 2 wherein said polymerization treatment is carried out so that the polymerized amount of said α-olefin in step (d) is 0.01 to 2,000 g per g of said solid product (III).

19. A process for producing α-olefin polymers which comprises:
(a) reacting one mol of an organoaluminum compound (A$_1$) with 1 to 4 mols of an electron donor (B$_1$) in 0.5 to 5 l of an aliphatic hydrocarbon solvent at a temperature of $-10°$ to $100°$ C., to obtain a solid product (I);
(b) reacting this solid product (I) with TiCl$_4$ in a ratio (Al/Ti) of the number of atoms of aluminum to that of Ti in TiCl$_4$ of 0.06 to 0.2, at a temperature of 10° to 90° C., and thereafter removing the resulting liquid portion and TiCl$_4$ freed by washing, to obtain a solid product (II);
(c) reacting 100 g of this solid product (II) with 50 to 200 g of an electron donor (B$_2$) and 20 to 500 g of an electron acceptor in 0.1 to 1 l of an aliphatic hydrocarbon at a temperature of 50° to 100° C. to obtain a solid product (III);
(d) combining 1 g of said solid product (III) and said 0.5 to 50 g of organoaluminum compound (A$_2$) (either prior to or subsequent to said polymerization treatment with 0.01 to 5,000 g of an α-olefin) with 0.05 to 10 g of a reaction product (G) obtained by reacting
(1) 1 mol of an organoaluminum compound (A$_3$) with
(2) 0.01 to 5 mols of an electron donor (B$_3$)
(3) such reaction being carried out at a temperature of $-30°$ to $100°$ C., to thereby establish a preliminary activated catalyst; and (f) polymerizing an α-olefin or α-olefins in the presence of this preliminarily activated catalyst.

20. A process according to claim 14 wherein the material obtained by said polymerization treatment and consisting of said solid product (III), said organoaluminum compound (A$_2$) and a polymer of said α-olefin, and said solid product (G) are separately stored and mixed together just before the polymerization of step (f) and employed as the catalyst therefor.

* * * * *